2 Sheets--Sheet 1.
J. BABCOCK, J. F. STILSON & J. C. LEIDY.
Improvement in Stalk-Cutters.
No. 114,252. Patented May 2, 1871.
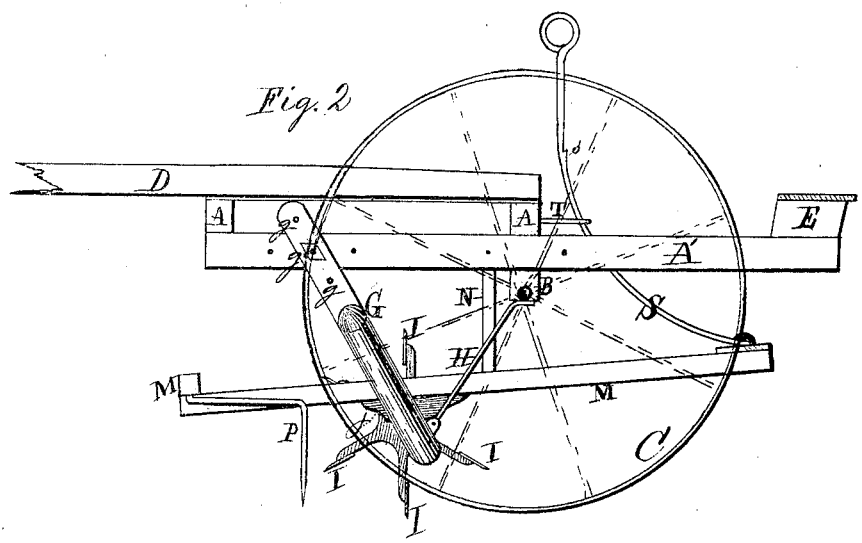
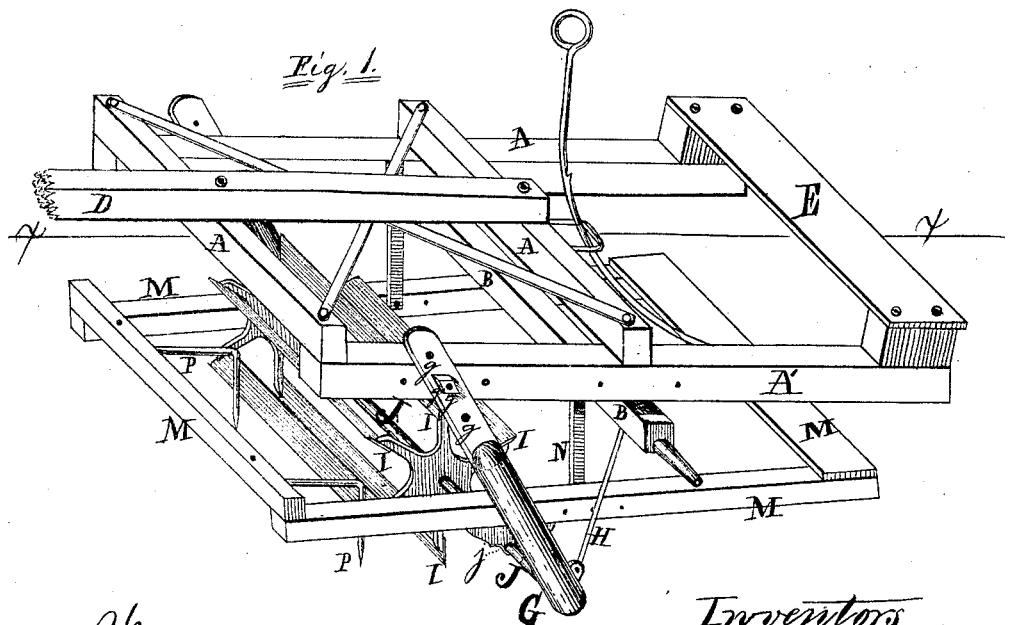

2 Sheets--Sheet 2.
J. BABCOCK, J. F. STILSON & J. C. LEIDY.
Improvement in Stalk-Cutters.
No. 114,252. Patented May 2, 1871.
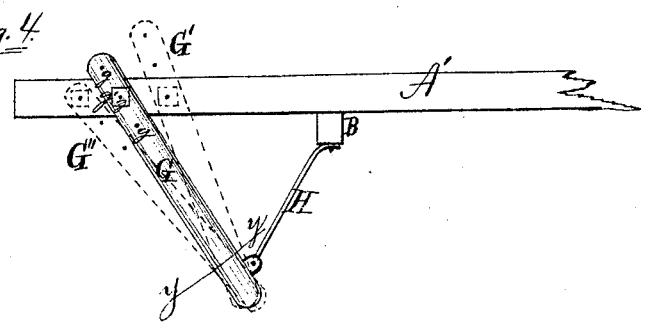
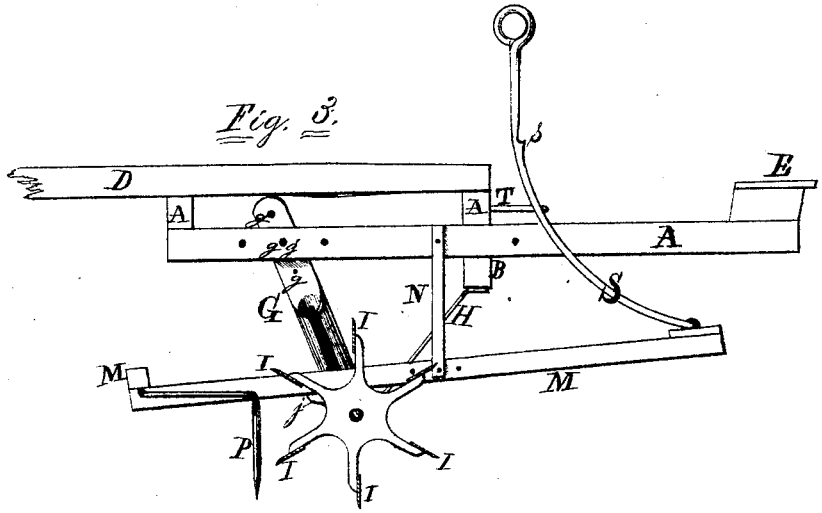
Witnesses:
Platt R. Richards
D. H. Clarke
Inventors
Josiah Babcock,
John F. Stilson, Jas. C. Leidy.
by W. P. Richards,
Their Atty.

United States Patent Office.

JOSIAH BABCOCK, JOHN F. STILSON, AND JAMES C. LEIDY, OF GALESBURG, ILLINOIS.

Letters Patent No. 114,252, dated May 2, 1871.

IMPROVEMENT IN STALK-CUTTERS.

The Schedule referred to in these Letters Patent and making part of the same.

---

We, JOSIAH BABCOCK, JOHN F. STILSON, and JAMES C. LEIDY, of Galesburg, in the county of Knox and State of Illinois, have invented certain Improvements in Stalk-Cutters, of which the following is a specification.

Nature and Objects of the Invention.

The nature of our invention relates to improvements in stalk-cutters; and

The invention consists—

First, in the manner of attaching the cylinder of cutters to the main frame, so as to allow the said cylinder to have a free vertical movement in its bearings, and at the same time to provide facilities, by a simple adjustment of the attaching device, for governing and controlling the force of the cut, all as hereinafter fully described.

Secondly, it consists in the combination of a foot-lever frame, with the main frame and cylinder of cutters, by which the operator may raise and lower the cutters at pleasure.

Description of the Accompanying Drawing.

Figure 1 is a perspective view of a machine complete, except a portion of the draft-pole and the wheels, embodying our invention.

Figure 2 is a side elevation of fig. 1, with the wheels added.

Figure 3 is a vertical sectional view of fig. 1 on the line $x\ x$.

Figure 4 is a detached view of the device for attaching the cutters to the main frame.

Figure 5 is a sectional view of that part of fig. 4 crossed by the line $y\ y$, and on the plane of said line.

General Description.

Letters A represent the main frame, rectangular in shape, and resting on the axle B, to which it is secured, the axle B in turn being supported on wheels C.

D is the draft-pole.

E is the driver's seat, on the rear end of the frame A.

G G are tubular rods, slotted longitudinally, as shown in the drawing, and their upper ends flattened and pierced with a series of holes, $g\ g\ g$, through which and through the frame pieces A' A' pass the bolts $g'\ g'$.

H H are braces, pivoted at their lower ends to the lower ends of the cylinders G G, and their upper ends secured to the axle B.

Letters I represent the cutters, carried on radial arms from a central shaft, J, in the ordinary style.

A ball, L, is keyed on each end of the shaft J, one of which is shown in the cross-section of the cylinder G, at fig. 5.

The balls L rest in the tubular cylinders G G, said cylinders forming bearings allowing the freest rotation of the shaft J; at the same time the shaft J may move freely longitudinally with the cylinders G G in the slots in the sides thereof.

M is a rectangular frame, pivoted, near the centers of its side pieces, to the lower ends of the pendants N N, said pendants themselves being pivoted at their upper ends to the frame A, so as to allow their vibration in a plane at right angles with the shaft J.

The shaft J is also provided with bearings $j$, on the side frame pieces M, as plainly shown at fig. 1.

P P are hooks, extending backward and downward from the forward part of the frame M, for the purpose of drawing the stalks into favorable position for cutting, as in ordinary machines of this class.

The operation of our invention is as follows:

The cylinder of cutters I are held firmly and allowed to revolve freely on their bearings in the tubular cylinders G G, while the arrangement of said bearings is, at the same time, such as to allow a perfectly free movement of the shaft J up and down in passing over obstructions, elevations, &c., and to allow the free movement vertically common to this kind of cutter-cylinders in revolving.

A great feature gained in our machine is the power to change the force of the cutters by an adjustment of the tubular cylinders G G.

By an inspection of fig. 4 it will be seen that when the tubular cylinders G are put in the nearly vertical position shown by the dotted lines G', the pressure of the bearings on the ball-journals L, when the machine is moved forward, will be nearly horizontal, and the force of the cut be governed by the weight of the cutter-cylinder.

By changing the tubular cylinder G to the position shown by the dotted lines G", fig. 4, it will be plainly seen that the pressure of the bearings on the ball-journals L will be at such an angle that the momentum of the machine forward will give downward force to the cutters I.

By pressing downward the rear end of the frame M until the hook $s$ on the rod S becomes engaged with the staple T, the cutter cylinder will be raised from the ground and held up for convenience in transportation.

The vibration of the bars N N allows the necessary reciprocation of the frame M in its movements.

Claims.

We claim as our invention—

1. The adjustable bearing cylinders G G, and ball-journals L, constructed and arranged to operate in combination with the cylinder of the cutters I and frame A, substantially as and for the purpose set forth.

2. The frame M, pendants N, bearing cylinders G, shaft J, lever S, catch T, and frame A, combined and arranged to operate substantially as described, and for the purpose set forth.

JOSIAH BABCOCK.
JOHN F. STILSON.
JAMES C. LEIDY.

Witnesses:
J. J. TUNNICLIFF,
P. R. RICHARDS.